US008368281B2

(12) United States Patent
Hoell et al.

(10) Patent No.: US 8,368,281 B2
(45) Date of Patent: Feb. 5, 2013

(54) MULTILAYER BRUSH HAVING A COMPOSITE

(75) Inventors: Hans Hoell, Hallstall (AT); Michael Bayer, Ludwigsburg (DE); Sven Hartmann, Stuttgart (DE); Gerhard Bachauer, Bad Ischl (AT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/810,674

(22) PCT Filed: Dec. 16, 2008

(86) PCT No.: PCT/EP2008/067590

§ 371 (c)(1),
(2), (4) Date: Sep. 27, 2010

(87) PCT Pub. No.: WO2009/083433

PCT Pub. Date: Jul. 9, 2009

(65) Prior Publication Data

US 2011/0018386 A1 Jan. 27, 2011

(30) Foreign Application Priority Data

Dec. 27, 2007 (DE) ......................... 10 2007 063 333

(51) Int. Cl.
*H02K 13/00* (2006.01)

(52) U.S. Cl. ......... 310/252; 310/248; 310/249; 310/251

(58) Field of Classification Search .................. 310/248, 310/249, 251, 252, 229–230, 245
See application file for complete search history.

(56) References Cited

U.S. PATENT DOCUMENTS

| | | | | |
|---|---|---|---|---|
| 6,815,862 | B2 * | 11/2004 | Inukai et al. | 310/251 |
| 2001/0015590 | A1 * | 8/2001 | Katoh et al. | 310/252 |
| 2002/0070555 | A1 * | 6/2002 | Osada et al. | 290/31 |
| 2005/0212376 | A1 * | 9/2005 | Niimi et al. | 310/251 |

FOREIGN PATENT DOCUMENTS

| | | | |
|---|---|---|---|
| EP | 1 447 887 | | 8/2004 |
| JP | 63302744 | | 12/1988 |
| JP | 63302744 | A * | 12/1988 |
| JP | 02086083 | A * | 3/1990 |
| JP | 2004-242383 | | 8/2004 |
| JP | 2007 501491 | | 1/2007 |

OTHER PUBLICATIONS

English-language Translation of Hitachi Chem Co Ltd JP-63302744 (1988).*
International Search Report for PCT/EP2008/067590, dated Apr. 24, 2009.
Suzuki et al., “Commutating Capability of Two-Grade Double-Layer Brush”, TANSO, No. 151, pp. 13-19, 1992.

* cited by examiner

*Primary Examiner* — Quyen Leung
*Assistant Examiner* — Jose Gonzalez Quinones
(74) *Attorney, Agent, or Firm* — Kenyon & Kenyon LLP

(57) ABSTRACT

A multilayer brush, which essentially contains a composite having a graphite component and having a copper component, and a layered structure, a first layer being furnished with a high copper component and a further layer being furnished with a comparatively low copper component. It is provided that the copper component of the first layer in comparison with the copper component of the second layer corresponds to a ratio of ≦3/2.

22 Claims, 1 Drawing Sheet

MULTILAYER BRUSH HAVING A COMPOSITE

FIELD OF THE INVENTION

The present invention relates to a multilayer brush having the features described herein.

BACKGROUND INFORMATION

A multilayer brush, in particular a multilayer carbon brush, of the type defined in the introduction is known in general as part of a DC motor. Such a DC motor is mechanically commutated and is used, for example, as an engine starter for an internal combustion engine. An applied current is fed into a rotor winding via a commutator with the aid of one or more brush pairs. The brushes of the brush pairs are usually made of a sintered material, containing essentially copper and graphite components. Both the brushes and the commutator are subject to wear during operation of the engine. The engine starter is typically designed for short-term operation per engine start and is suitable for 30,000 to 60,000 operating cycles.

If the engine starter is to be designed for higher loads and/or longer operating times, in particular with a 12V operating voltage for passenger vehicles, two-layer brushes may be used, for example, where two different carbon brushes are pressed together to form one unit, their layers having a different copper content and having different specific resistivities accordingly. In the combination of the two carbon brush layers, emphasis has previously been placed in particular on maintaining the operating cycles or operating counts with regard to standard operation of the engine starter. In dimensioning the copper components, consequently criteria relating to the power and operating capacity to start the internal combustion engine, as are required in standard operation, come into effect. Predominantly the power of the engine starter and lowering the electrical resistance on the brushes are of primary concern, so that only operating counts in the range of 30,000 to 60,000 are achievable with such carbon brushes. The operating cycles are thus in the category of serial applications and are not in the category of special applications such as a start-stop operation.

SUMMARY OF THE INVENTION

The multilayer brush according to the exemplary embodiments and/or exemplary methods of the present invention having the features described herein offers the advantage over the related art that much higher values than the conventional 30,000 to 60,000 operating counts are achievable. The improvement in operating counts per unit of length (mm) of usable carbon brush may amount to more than 50% of the previous wear length value per unit of length (mm), so that a high additional number of start operations of the internal combustion engine may be performed above the operating count of 60,000. The start operations include predominantly so-called repeat starts or hot starts on the one hand as well as so-called cold starts on the other hand. The copper content of the first layer is to be selected in a ratio of ≦3/2 in comparison with the copper content of the second layer.

A definite increase in operating cycles is achievable here in comparison with conventional multilayer brushes, so that more demanding types of operation such as start-stop operation of the internal combustion engine, for example, are possible. In addition to the improved wear resistance with regard to mechanical and electrical sparking, the proposed approach is characterized in that the power of the internal combustion engine is maintained even at elevated operating counts without having to use any harmful and therefore undesirable substances such as lead. Due to the improvement in the wear resistance of the brushes, ultimately the risk of failure of the engine starter and thus of the internal combustion engine is reduced.

Advantageous refinements are derived through the features of the further descriptions herein.

According to one exemplary embodiment of the present invention, it is provided that the second layer has a copper content of ≦32 percent by weight (wt %), which yields an optimal ratio to the first layer and therefore ensures an above-average wear resistance of the multilayer brush.

In one advantageous embodiment of the present invention, it is provided that the composite of graphite content and copper content is mixed with a lubricant. The lubricant is used here in the form of a solid lubricant and thus also as a binder for the brush constituents.

In another advantageous embodiment of the present invention, it is provided that the first layer corresponds to a first partial brush and the second layer corresponds to a second partial brush. Thus the particular layer is manufacturable separately and by way of mass production to be subsequently combined to form the composite.

According to another exemplary embodiment of the present invention, it is provided that the first layer and the second layer form a compressed composite. A conventional, favorable, and controllable joining method may be used as the basis for this.

Furthermore, the use of a multilayer brush in a DC motor, in particular an engine starter, of a motor vehicle having an automatic start-stop system or a start-stop function is advantageous. A start-stop function may be used to operate the internal combustion engine in a start-stop mode, i.e., in a fuel-saving mode, this mode subjects the materials to a load. The start-stop function is used to turn off the internal combustion engine in the standing phase of the vehicle to reduce fuel consumption. This operating mode is implementable in a convenient manner, for example, with the help of an integrated starter generator, in particular in conjunction with a control unit. The control unit here may perform triggering of the automatic start-stop system as an independent device. For example, an integration of functions into an existing control unit of the motor vehicle is also possible.

The exemplary embodiments and/or exemplary methods of the present invention and advantageous embodiments according to the features of the descriptions herein are explained in greater detail below on the basis of the exemplary embodiments depicted in the drawings without restricting the scope of the present invention to this extent. Instead, the present invention includes all modifications, changes, and corresponding structure which are possible within the scope of the claims.

DETAILED DESCRIPTION

Figure 1:
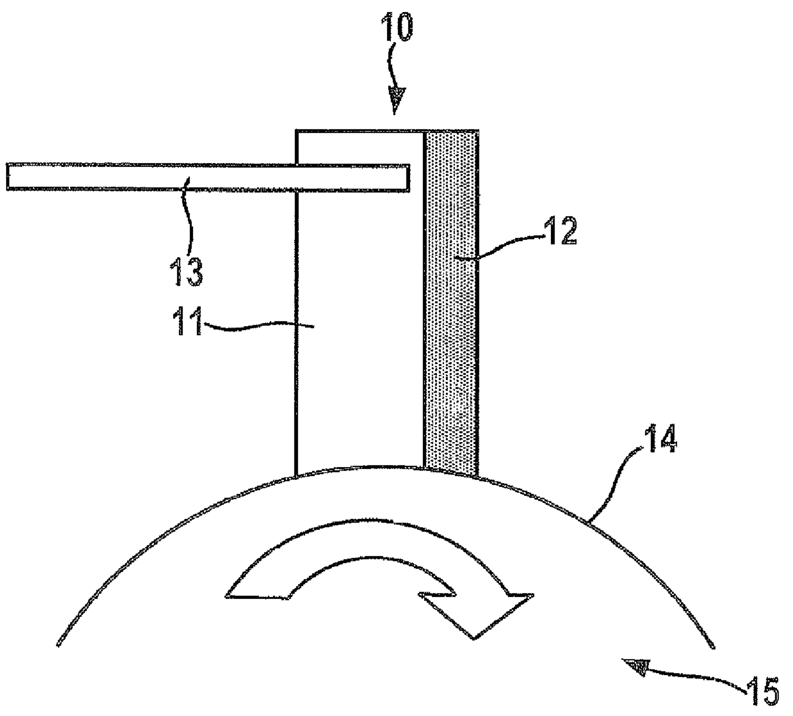
FIG. 1 shows a schematic diagram of a layout of parts of a DC motor having a multilayer brush and a commutator.

FIG. 1 shows a schematic diagram of a multilayer brush 10. Multilayer brush 10 is a composite having essentially a graphite component and a copper component. Furthermore, multilayer brush 10 is provided with a layered structure in which a first layer 11 has a high copper content, and second layer 12 has a comparatively low copper content. First layer 11 functions as the performance layer, while second layer 12 is used as the commutation layer. The performance layer should carry most of the applied current and consequently has a relatively low resistance. First layer 11 is therefore on the leading side of a so-called commutator section and therefore comes in contact with another commutator section first, i.e., before second layer 12, when the commutator is rotating.

The low resistance of this layer is established by a relatively high copper content in the carbon brushes. In contrast with the low-resistance performance layer, the commutation layer, i.e., second layer 12, has a relatively high electrical resistance, which helps to reduce the current density peaks in the approach of the particular section and thus to create no essential commutation losses. Second layer 12 is therefore provided with less copper in comparison with first layer 11.

For the power input, an electrically conductive strand 13 is provided at one end of multilayer brush 10. At another end of multilayer brush 10 opposite that end, a section of a rotatably mounted commutator 14 is provided and is in effective electromechanical connection to multilayer brush 10. The direction of rotation of commutator 14 corresponds to the clockwise direction here. The unit of multilayer brush 10 and commutator 14 is part of a DC motor 15, which is used as an engine starter in particular.

It is important here that the copper content of first layer 11 in comparison with the copper content of second layer 12 corresponds to a ratio of ≦3/2. As an additional condition, second layer 12 may be designed in such a way that it has a copper content of ≦32 percent by weight. Based on measurements, the ratio of the copper content of the performance layer to the copper content of the commutation layer has proven to be a decisive factor. The ratio of contents is thus definitive in order to reliably achieve a high additional number of repeat starts, in particular hot starts, of the internal combustion engine in addition to the usual operating count of up to 60,000 normal starts. The present optimized content ratio of the copper constituents likewise produces an increase in the number of cold starts of the internal combustion engine.

If the required operating count of the aforementioned engine starter, which is connected to a 12V power supply, increases due to a mode of operation in particular, which may be a start-stop operation, involving frequent repeat starts, i.e., hot starts of the internal combustion engine, the material demands which thereby also increase may be taken into account with a targeted variation in the copper content in the carbon brush layers in the sense of an improved material mixture. The improvement in operating counts thereby achievable per mm of usable carbon brush may amount to more than 50% of the previous value per mm of wear length.

Figure 2:
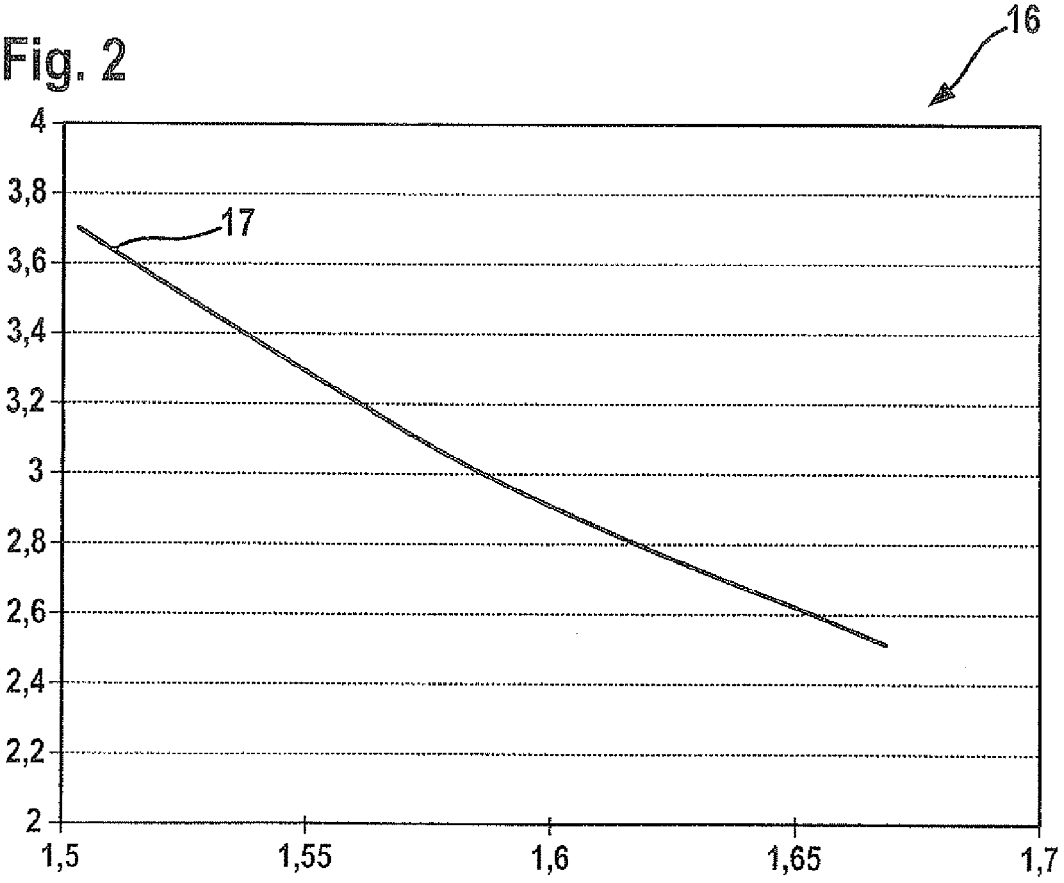
FIG. 2 shows a diagram to illustrate a standardized number of engine starts per unit of carbon brush wear as a function of the ratio of the copper content of a performance layer and the copper content of a commutation layer.

According to FIG. 2, a standardized operating count per unit of carbon brush wear is shown in the form of a diagram 16 for a comparison of copper contents in layers 11, 12. A standardized number of engine starts, in particular fast starts per unit of carbon brush wear, is plotted here on the ordinate as the basis for evaluation. The particular ratio of the copper contents of the performance layer and the commutation layer is plotted on the abscissa. Values in a bandwidth of 2 to 4 are plotted on the vertical axis of diagram 16, and values from 1.5 to 1.7 are plotted on the horizontal axis of diagram 16. A curve 17 resulting from the individual measured points represents the number of fast starts per mm of carbon brush wear. The highest operating count is detectable at a ratio of ≦3/2 of the copper content of first layer 11 compared with the copper content of second layer 12. Expressed in other terms, the carbon brush wear is lowest at a quotient of less than 3/2. For further optimization, second layer 12 may be designed in such a way that it has a copper content of ≦32 percent by weight. The ratio of contents and the value resulting from this depends on the measured results of comparable carbon brushes and reflects only a portion of the possible optimizations.

In summary, the approach according to the exemplary embodiments and/or exemplary methods of the present invention includes the copper ratio of multilayer brush 10, in particular the two-layer carbon brush, which is essentially a composite having a graphite component and a copper component as well as a layered structure, a first layer 11 being furnished with a high copper content and another layer 12 being furnished with a comparatively low copper content. The copper content of first layer 11 in comparison with the copper content of second layer 12 corresponds to a ratio of ≦3/2.

What is claimed is:

1. A multilayer brush, comprising:

a composite having a graphite component, a copper component, and a layered structure, a first layer being furnished with a high copper content and a second layer being furnished with a comparatively low copper content;

wherein the copper content of the first layer in comparison with the copper content of the second layer corresponds to a ratio of ≦3/2.

2. The multilayer brush of claim 1, wherein the second layer has a copper content of ≦32 percent by weight (wt %).

3. The multilayer brush of claim 1, wherein the composite of the graphite component and the copper component is mixed with a lubricant.

4. The multilayer brush of claim 1, wherein the first layer corresponds to a first partial brush, and the second layer corresponds to a second partial brush.

5. The multilayer brush of claim 1, wherein the first layer and the second layer form a compressed composite.

6. A DC motor, comprising:

a multilayer brush, including:

a composite having a graphite component, a copper component, and a layered structure, a first layer being furnished with a high copper content and a second layer being furnished with a comparatively low copper content, wherein the copper content of the first layer in comparison with the copper content of the second layer corresponds to a ratio of ≦3/2.

7. An engine starter, comprising:

a DC motor, including a multilayer brush that includes:

a composite having a graphite component, a copper component, and a layered structure, a first layer being furnished with a high copper content and a second layer being furnished with a comparatively low copper content, wherein the copper content of the first layer in comparison with the copper content of the second layer corresponds to a ratio of ≦3/2.

8. A motor vehicle, comprising:

at least one of a DC motor and an engine starter;

wherein the DC motor and the engine starter each include a multilayer brush that includes:

a composite having a graphite component, a copper component, and a layered structure, a first layer being furnished with a high copper content and a second layer being furnished with a comparatively low copper content, wherein the copper content of the first layer in comparison with the copper content of the second layer corresponds to a ratio of ≦3/2.

9. The motor vehicle of claim 8, further comprising:

an automatic start-stop system.

10. The motor vehicle of claim 9, further comprising:

a control unit for controlling the automatic start-stop system.

11. The motor vehicle of claim 8, wherein the second layer has a copper content of ≦32 percent by weight (wt %).

12. The motor vehicle of claim 8, wherein the composite of the graphite component and the copper component is mixed with a lubricant.

13. The motor vehicle of claim 8, wherein the first layer corresponds to a first partial brush, and the second layer corresponds to a second partial brush.

14. The motor vehicle of claim 8, wherein the first layer and the second layer form a compressed composite.

15. The motor vehicle of claim 8, wherein the second layer has a copper content of ≦32 percent by weight (wt %), and wherein the composite of the graphite component and the copper component is mixed with a lubricant.

16. The motor vehicle of claim 15, wherein the first layer corresponds to a first partial brush, and the second layer corresponds to a second partial brush, and wherein the first layer and the second layer form a compressed composite.

17. The motor vehicle of claim 8, wherein the first layer corresponds to a first partial brush, and the second layer corresponds to a second partial brush, and wherein the first layer and the second layer form a compressed composite.

18. The multilayer brush of claim 1, wherein the second layer has a copper content of ≦32 percent by weight (wt %), and wherein the composite of the graphite component and the copper component is mixed with a lubricant.

19. The multilayer brush of claim 18, wherein the first layer corresponds to a first partial brush, and the second layer corresponds to a second partial brush, and wherein the first layer and the second layer form a compressed composite.

20. The multilayer brush of claim 1, wherein the first layer corresponds to a first partial brush, and the second layer corresponds to a second partial brush, and wherein the first layer and the second layer form a compressed composite.

21. The multilayer brush of claim 1, wherein the second layer has a copper content of ≦32 percent by weight (wt %), wherein the composite of the graphite component and the copper component is mixed with a lubricant, and wherein the first layer corresponds to a first partial brush, and the second layer corresponds to a second partial brush.

22. The multilayer brush of claim 1, wherein the second layer has a copper content of ≦32 percent by weight (wt %), wherein the composite of the graphite component and the copper component is mixed with a lubricant, and wherein the first layer and the second layer form a compressed composite.

* * * * *